United States Patent [19]

Reiss et al.

[11] Patent Number: 4,508,988

[45] Date of Patent: Apr. 2, 1985

[54] PERMANENT MAGNET MOTOR STATOR FOR D.C. MOTORS

[75] Inventors: Leon G. Reiss, Dublin; Roy D. Schultz, Radford, both of Va.

[73] Assignee: Kollmorgen Technologies Corporation, Dallas, Tex.

[21] Appl. No.: 559,446

[22] Filed: Dec. 8, 1983

Related U.S. Application Data

[63] Continuation-in-part of Ser. No. 451,857, Dec. 21, 1982, abandoned.

[51] Int. Cl.³ .......................................... H02K 21/26
[52] U.S. Cl. .................................... 310/154; 310/177
[58] Field of Search ............... 310/154, 254, 258, 259, 310/220, 226, 40, 177

[56] References Cited

U.S. PATENT DOCUMENTS

| | | | |
|---|---|---|---|
| 2,835,834 | 5/1958 | Steinegger | 310/154 |
| 3,054,916 | 9/1962 | Cobb | 310/154 |
| 3,102,964 | 9/1963 | Bennett et al. | 310/154 |
| 3,590,293 | 6/1971 | Susdorf | 310/154 |
| 3,671,841 | 6/1972 | Hoffman | 310/154 X |
| 4,151,435 | 4/1979 | Jandeska et al. | 310/154 |

Primary Examiner—Mark O. Budd
Attorney, Agent, or Firm—Morgan, Finnegan, Pine, Foley & Lee

[57] ABSTRACT

In a permanent magnet commutator type D.C. servomotor having a wound iron core armature and a permanent magnet stator, the stator includes a uniquely formed annular yoke. The unique yoke includes a central opening and a plurality of permanent magnet pole pieces, which are securely held to arcuate magnetic material projecting into the opening and which are spaced equally from and about the axis of the yoke. The magnets and arcuate magnetic material form boundaries to accommodate the armature and also form a relieved area between the magnets designed for reduced field distortion. The radial thickness of the magnet pole pieces, the arcuate members of magnetic material and the radial thickness of the yoke are proportioned relative to each other and to the I.D. of the pole pieces at prescribed values to maximize the motor performance.

10 Claims, 8 Drawing Figures

PERMANENT MAGNET MOTOR STATOR FOR D.C. MOTORS

This application is a continuation-in-part application of application Ser. No. 451,857, filed Dec. 21, 1982, now abandoned.

BACKGROUND OF THE INVENTION

1. Field of the Invention

This invention relates to stators for permanent magnet commutator type D.C. electric servomotors and, more particularly, to a new and improved optimization of the stator interpole area to improve high torque performance capability of such D.C. electric servomotors.

2. Description of the Prior Art

Most permanent magnet D.C. electric servomotors include a stator fabricated from a tube manufactured in one of a variety of methods to which are added the permanent magnets. Such tubing in such servomotors is usually cylindrical with an essentially uniform wall thickness. Permanent magnets in groups of multiples of two are equally spaced symmetrically with respect to the pole centerline and are held in fixed position by mechanical means, such as by clamps or with an adhesive. The thickness of the magnets, radial of the pole centerline, is determined by the magnet material necessary to maintain sufficient magnetic saturation in the servomotor magnetic circuit. The passive magnetic tube which, with the permanent magnets, makes up the stator, may be continuous or, as is more common, may be a laminate of a plurality of coaxial discs which, in the lamination, form the tube.

Advances in technology have increased the need for higher motor torques. Attempts, heretofore, to improve high torque motor performance have met with limited success. Improvements have made stronger magnets available and made possible the use of thinner magnets. The result has been a reduction in interpole spacing between the yoke and armature. The result is increased interpole leakage which induces voltage in armature coils being commutated which results in excessive sparking at the brushes and increases the risk of flashover at the commutator. This leakage is the result of armature reaction. In addition, in one region of the stator the armature field opposes the stator flux while, in another region, the armature field aids the stator flux. The net result, because of steel saturation, is a reduction in overall stator flux.

The above described problem is particularly pronounced when rare earth ($RECO_5$) magnets with an energy product of 18 MGO are used in the stator in combination with a conventional wound iron core armature. These rare earth magnets are highly resistant to flux reversals. In order for a permanent magnet commutator type D.C. electric servomotor utilizing these rare earth magnets to accelerate and decelerate quickly without sacrificing performance, an expensive cup type armature is necessary in lieu of the conventional wound iron core armature. A typical example of a permanent magnet motor having a cup type armature is described in U.S. Pat. No. 3,102,964 by J. L. Bennett, et al. These cup type armatures are relatively difficult to manufacture and add considerably to the cost of the motor.

Accordingly, there is a need for a permanent magnet commutator type D.C. electric servomotor having a low cost conventional wound iron core armature which can accelerate and decelerate quickly without sacrificing performance.

SUMMARY OF THE INVENTION

The apparatus of the present invention provides a permanent magnet commutator type D.C. electric servomotor utilizing high strength magnets and a conventional wound iron core armature. The high strength magnets, which are preferably of the rare earth type, are affixed to a tubular stator having a relieved interpole area. The relieved interpole areas confine the flux from the poles of the permanent magnets, thereby increasing their effective strength and improving the performance of the motor.

In the instant invention it has been further discovered that the effects of armature reaction flux in the stator interpole area can be reduced and high torque capability and commutation can be improved over a comparable servomotor utilizing a conventional wound iron core armature by increasing the non-magnetic interpole area. Torque per ampere at high torques is improved. Distortion of primary stator flux is reduced and peak torque is improved. Primary flux at high armature currents is improved. Moreover, maximum performance from a servomotor of a given size can be attained if the interpole area at the end of the permanent magnet is relieved to a depth which involves ratios to other important magnet dimensions of the stator. This is accomplished by maintaining ratios of the depth of the interpole relief to the sum of the permanent magnet pole length and annular yoke thickness and to the inside diameter or I.D. of the pole pieces.

BRIEF DESCRIPTION OF THE DRAWINGS

The instant invention will be more fully described and be better understood from the following description taken with the appended drawings.

DETAILED DESCRIPTION OF THE INVENTION

Figure 1:
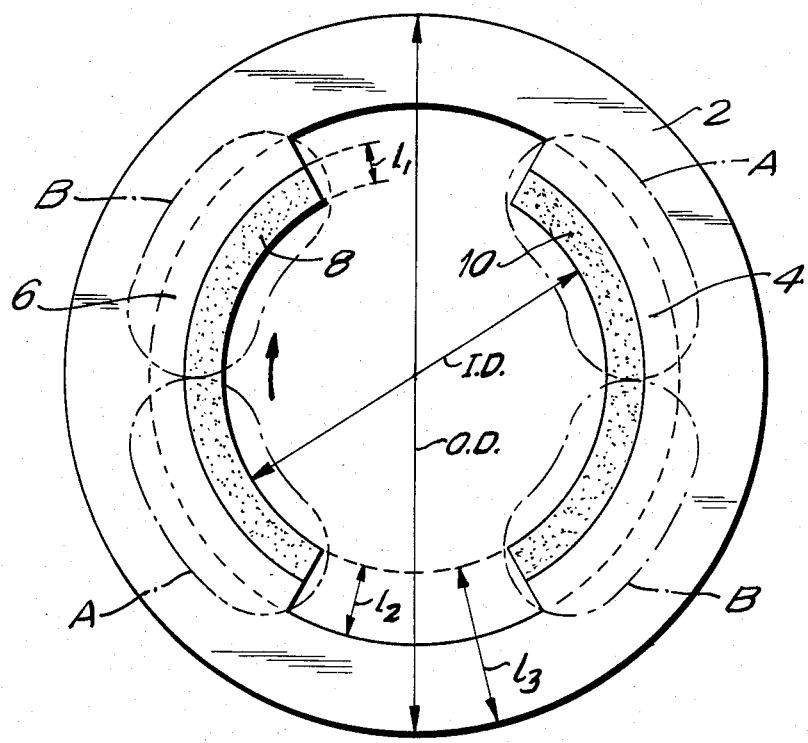
FIG. 1 is an end view of a substantially actual size permanent magnet stator having relieved interpole areas.

Referring now to FIG. 1, the stator for a permanent magnet D.C. servomotor is shown substantially in its actual size from one end of the core and is made up of cylindrical yoke 2 of magnetic material, such as soft iron, having equally spaced and disposed therein arcuate members 4, 6, also of magnetic material, such as soft iron, and affixed to the arcuate inner surfaces of members 4, 6, respectively, arcuate permanent magnets 8, 10 of rare earth cobalt or other high strength, permanent magnetic materials. Preferably, the permanent magnets are formed of a rare earth cobalt magnetic material having an energy product of 18 MGO. Arcuate members 4, 6 may be screwed, bolted or adhesively affixed to the inner surface of yoke 2 or may be formed as an integral part of yoke 2. Yoke 2 may be a continuous tube, or, preferably, yoke 2 and arcuate members 4 and 6 are stamped and the stampings are stacked, one on the other, and laminated into a tube held together by welds, rivets or other structurally sound means. Any method that is used, of course, must not interfere with the magnetic properties of the laminated structure.

The stator core of FIG. 1 is shown as applied to a servomotor having an armature turning clockwise. The armature field in such a servomotor will oppose the stator flux in the stator regions outlined in dot-dash lines and designated B and aid the stator flux in the regions similarly outlined and designated A on the stator core.

As already noted, the performance of the permanent magnet D.C. servomotor of the instant invention is maximized by proportioning the radial thickness of various parts of the permanent magnet stator components to each other and to the I.D. of the stator core. As mentioned above, the stator of FIG. 1 is drawn substantially to its actual size. A permanent magnet stator was constructed having a housing O.D. of 5.25 inches and a stack length of six inches. The servomotor further included a conventional wound iron core armature having an O.D. of 2.95 inches. The motor also included an air gap of 0.030 inches, thereby providing an I.D. of 3.01 inches.

It can be appreciated from FIG. 1 that the radial thickness $l_2$ includes the radial thickness $l_1$ of permanent magnet 8, 10 and the radial thickness of the arcuate member of magnetic material 4, 6. The radial thickness $l_3$ includes the radial thickness of permanent magnet 8, 10, the radial thickness of arcuate member of magnetic material 4, 6 and the radial thickness of stator yoke 2. It has been discovered that the desired ratio of $l_2/l_3$ has a value of $0.44 \pm 20\%$ for a two pole motor or a value of $$\left\{ 1 \Big/ \left( 1 + \frac{2.56}{\text{No. of Poles}} \right) \right\} \pm 20\%$$

for motors of two or more pole pieces. The desired range of $l_2/l_3$, therefore, is from 0.53 to 0.35 for a two pole motor. Motor performance is further improved by making the ratio of $l_3$ to the I.D. of the pole pieces a value of $0.39 + 15\% - 5\%$ for two pole motors or a value of $$\left\{ \left( 1 + \frac{2.56}{\text{No. of Poles}} \right) \Big/ 5.83 \right\} + 15\% - 5\%$$

for motors of two or more poles. The range of $l_3$/I.D., therefore, is 0.37 to 0.45 for a two pole motor. Further performance improvements are attained by making the ratio $l_2$/I.D. at a value of $0.17 \pm 15\%$, or in other words a range of one 0.20 to 0.14. If one were to measure the actual dimensions $l_1$, $l_2$, $l_3$, and I.D. of FIG. 1, one would find that the ratios of these measured dimensions all fall within the ranges described above. It should be noted that the instant invention is applicable to motors having two poles and motors having four or more poles.

Figure 2:
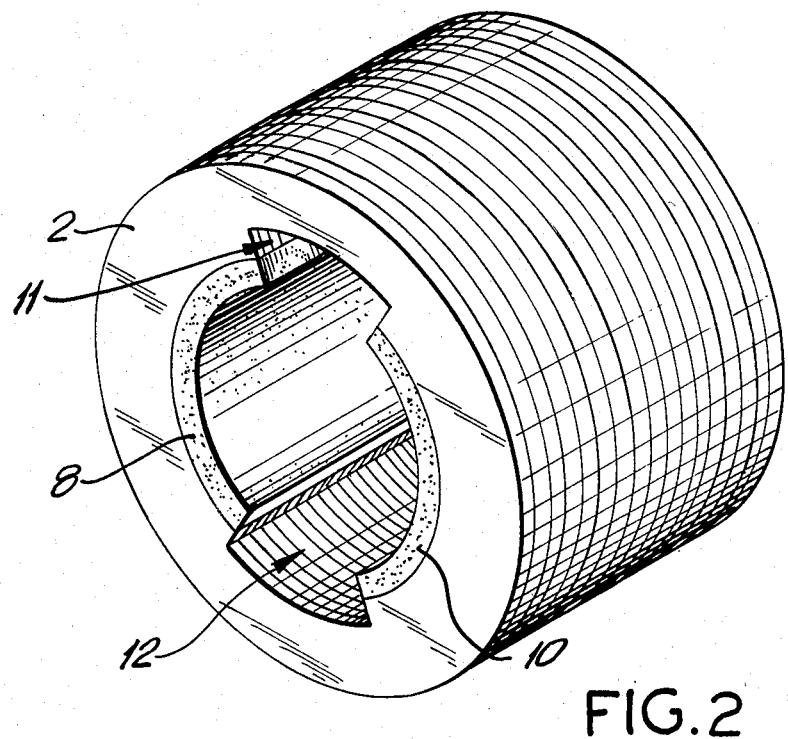
FIG. 2 is an isometric view of the permanent magnet stator of FIG. 1.

Referring now to FIG. 2, an isometric view of the permanent stator of FIG. 1 is provided. In FIG. 2 it can be appreciated that arcuate members, which are disposed beneath the magnets 8, 10, are formed integrally with the yoke 2. The stator is illustrated as having two relieved interpole areas 11, 12.

The superior performance characteristics of the present invention may be further appreciated by referring to the below listed examples which compare the present invention to a comparable prior art servomotor.

EXAMPLE I

Figure 3:
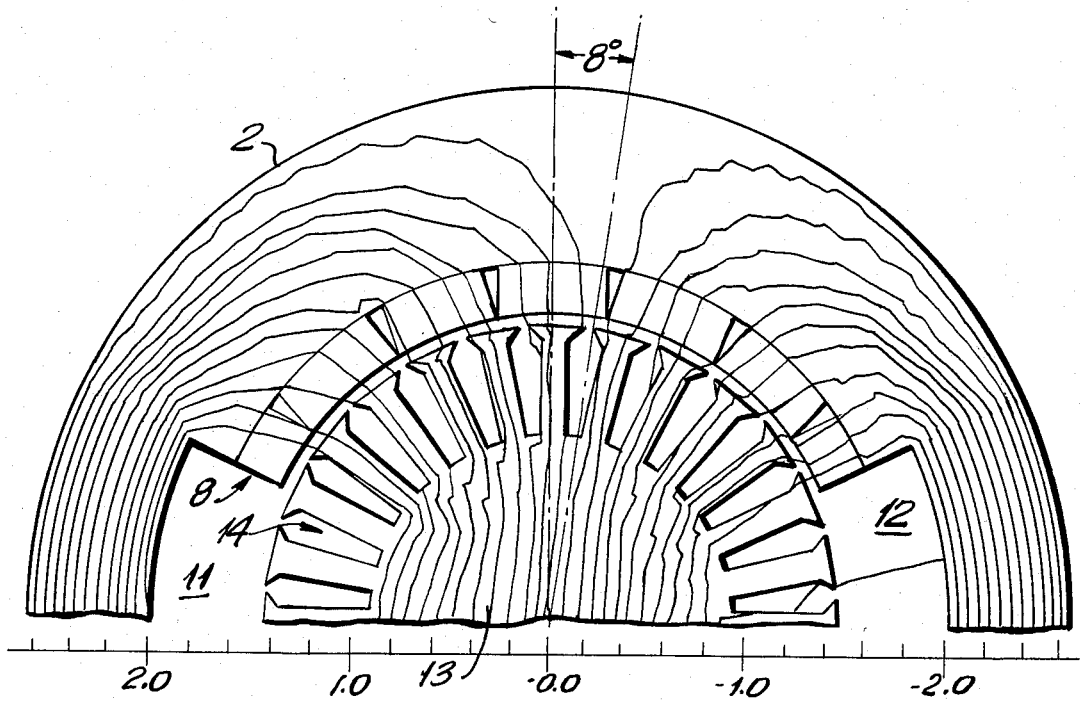
FIG. 3 is an enlarged end view of one half the magnetic flux distribution of the apparatus of the present invention at a current of 27.8 amperes.

Referring now to FIG. 3, the drawing illustrates an enlarged end view of one half the flux distribution present in the stator of FIGS. 1 and 2 when a current of 27.8 amperes is applied to a conventional iron core armature 13. The yoke 2 of the stator and the armature 13 having a plurality of slots 14 for windings are represented schematically. The arcuate permanent magnet 8 is comprised of a plurality of magnet sections. Preferably, the magnet 8 is comprised of one or two magnet segments. The yoke 2 includes relieved interpole areas 11, 12. The thin irregular lines illustrate the flux paths generated at the continuous stall performance point of the servomotor. There is a virtual absence of flux paths in the relieved interpole areas 11, 12 and the pole displacement vector defined by the flux paths is located at an angle of 8°. The scale at the bottom of FIG. 3 is useful in determining the distance of the flux paths from the center of the servomotor and the approximate dimensions of the servomotor in inches.

EXAMPLE II

Figure 4:
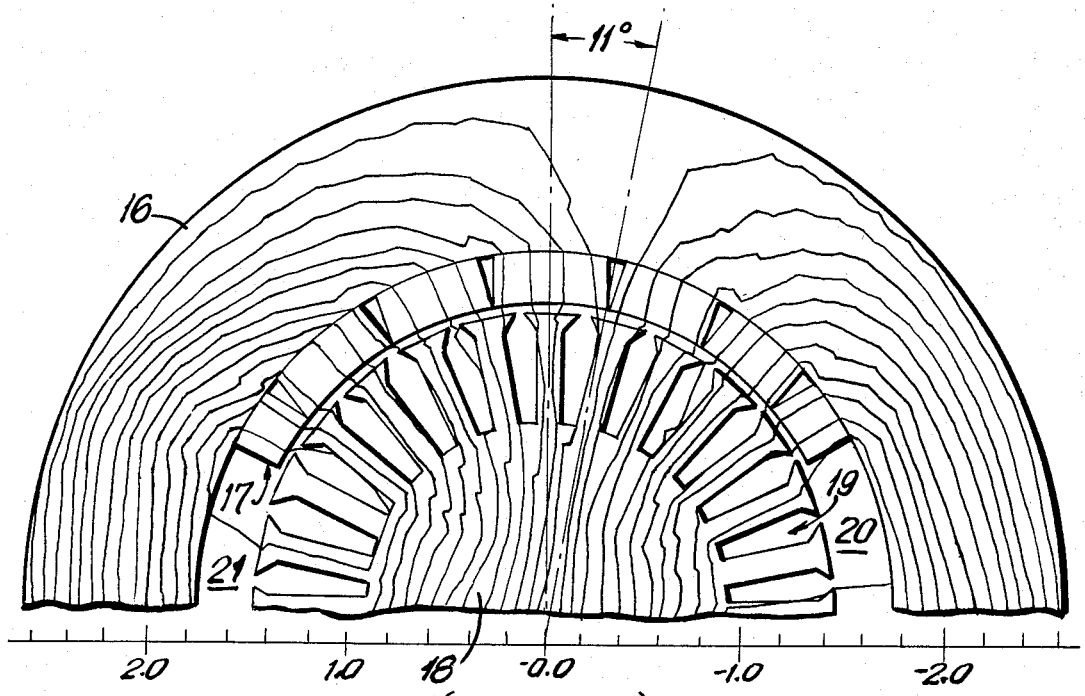
FIG. 4 is an enlarged end view of one half the magnetic flux distribution of a prior art servomotor at a current of 27.8 amperes.

Referring now to FIG. 4, the drawing illustrates an enlarged end view of one half the flux distribution present in a comparable prior art servomotor. The prior art servomotor is comprised of a stator yoke 16, permanent magnet 17, and an armature 18 having a plurality of slots 19. The O.D. of the yoke 16 is equal to the O.D. of the yoke 2 of the present invention as illustrated in FIG. 3 and the O.D. of the armature 18 is equal to the O.D. of the armature 13 of the present invention. When a current of 27.8 amperes is applied to the windings of the armature 18, the thin irregular lines represent the flux paths at the same load point as Example I. It can be appreciated that there is an increase in the number of flux paths in the interpole areas 20, 21 and that pole displacement vector is at an angle of 11°. The flux shift of Example I shows a 3° reduction over that of Example II. The flux shift is caused by armature reaction which is described above.

EXAMPLE III

Figure 5:
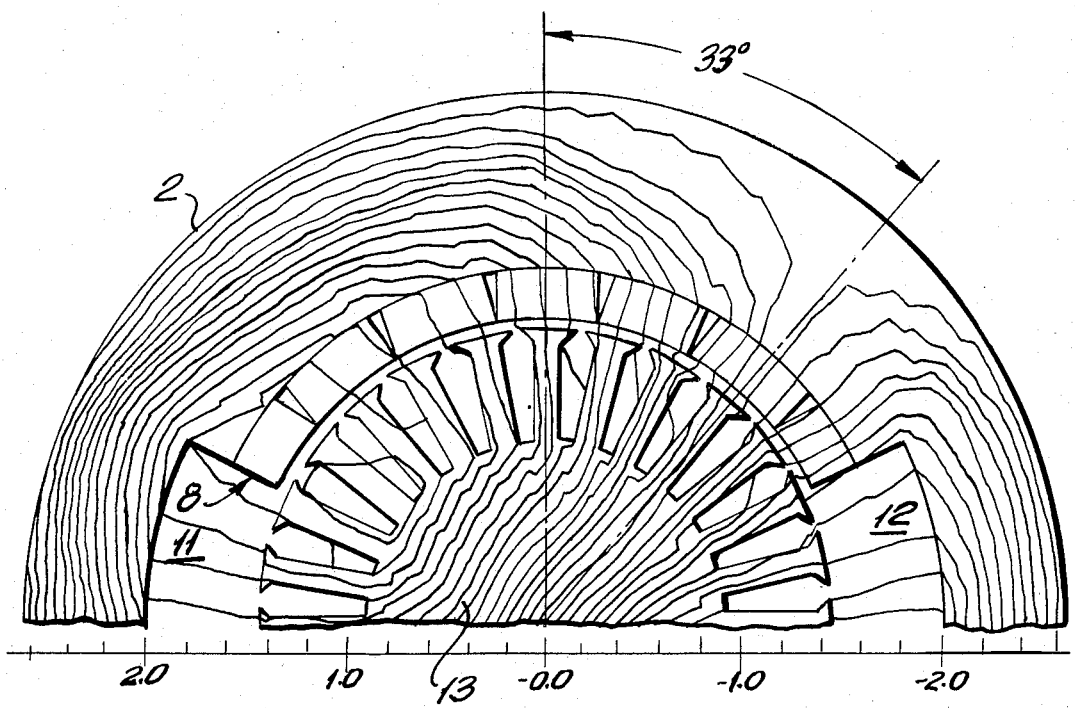
FIG. 5 is an enlarged end view of one half the magnetic flux distribution of the apparatus of the present invention at a current of 192 amperes.

Referring now to FIG. 5, the drawing illustrates an enlarged end view of one half the flux distribution present when a current of 192 amperes is applied to the armature 13 of the apparatus of the present invention as illustrated in FIGS. 1, 2, 3. The 192 ampere current represents twice the rated peak current. It is apparent that there are some flux paths through the relieved interpole areas 11, 12 and that there has also been a shift of the pole displacement vector to 33°.

EXAMPLE IV

Figure 6:
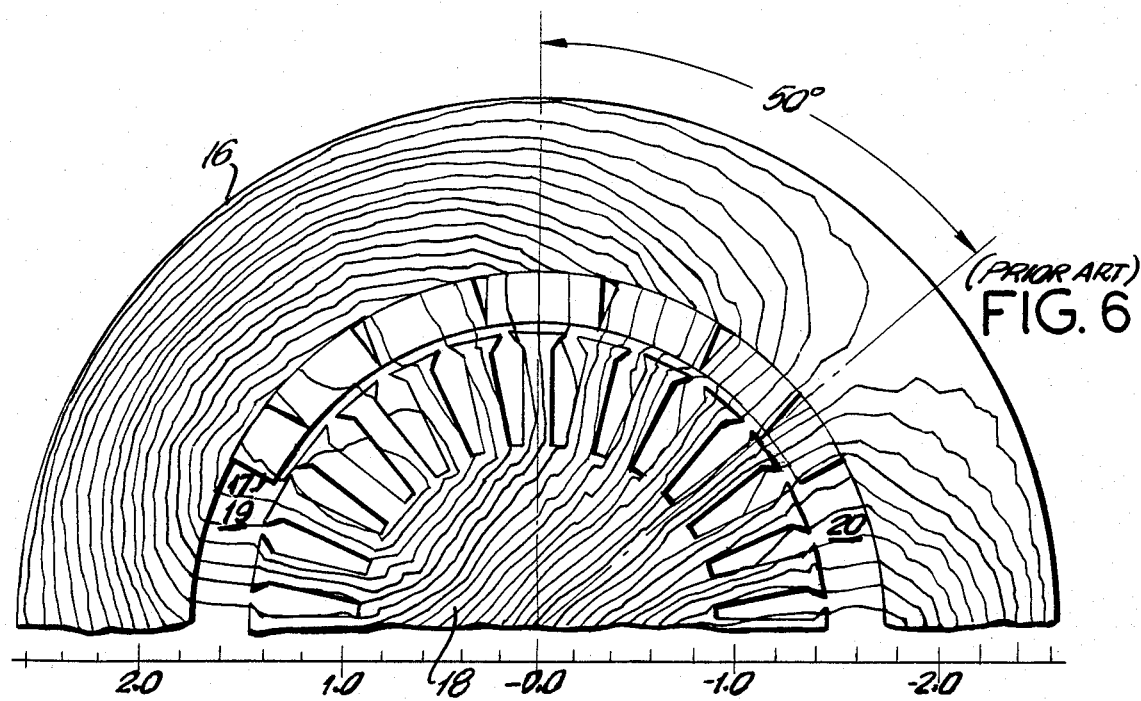
FIG. 6 is an enlarged end view of one half the magnetic flux distribution of a prior art servomotor at a current of 192 amperes.

Referring now to FIG. 6, the drawing illustrates an enlarged end view of one half the flux distribution when a current of 192 amperes is applied to the prior art servomotor illustrated in FIG. 4 which includes the yoke 16, the permanent magnet 17 and the armature 18. Although, the load in Example IV is identical to the load of Example III, there is a significant increase in the number of flux paths in the interpole areas 19, 20. The increased number of flux paths is indicative of armature reaction and corresponding poor performance. The pole displacement vector is at a 50° angle which represents a 17° increase in flux shift over the apparatus of the present invention as illustrated in FIG. 5. The reduced number of flux paths and the reduced flux shift in the apparatus of the present invention indicates reduced armature reaction and improved performance.

Figure 7:
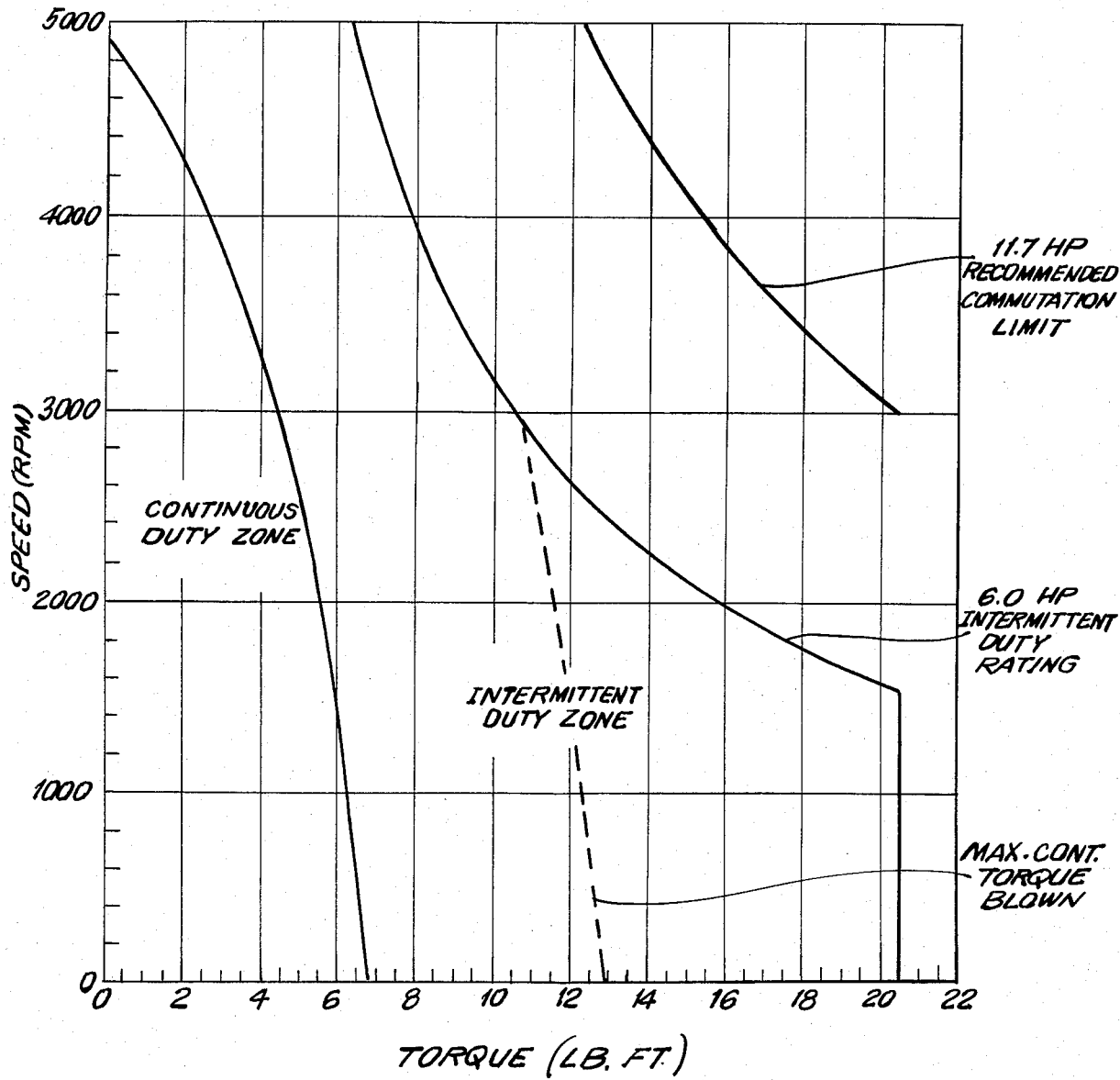
FIG. 7 is a graph of the performances curves for the apparatus of the present invention.
Figure 8:
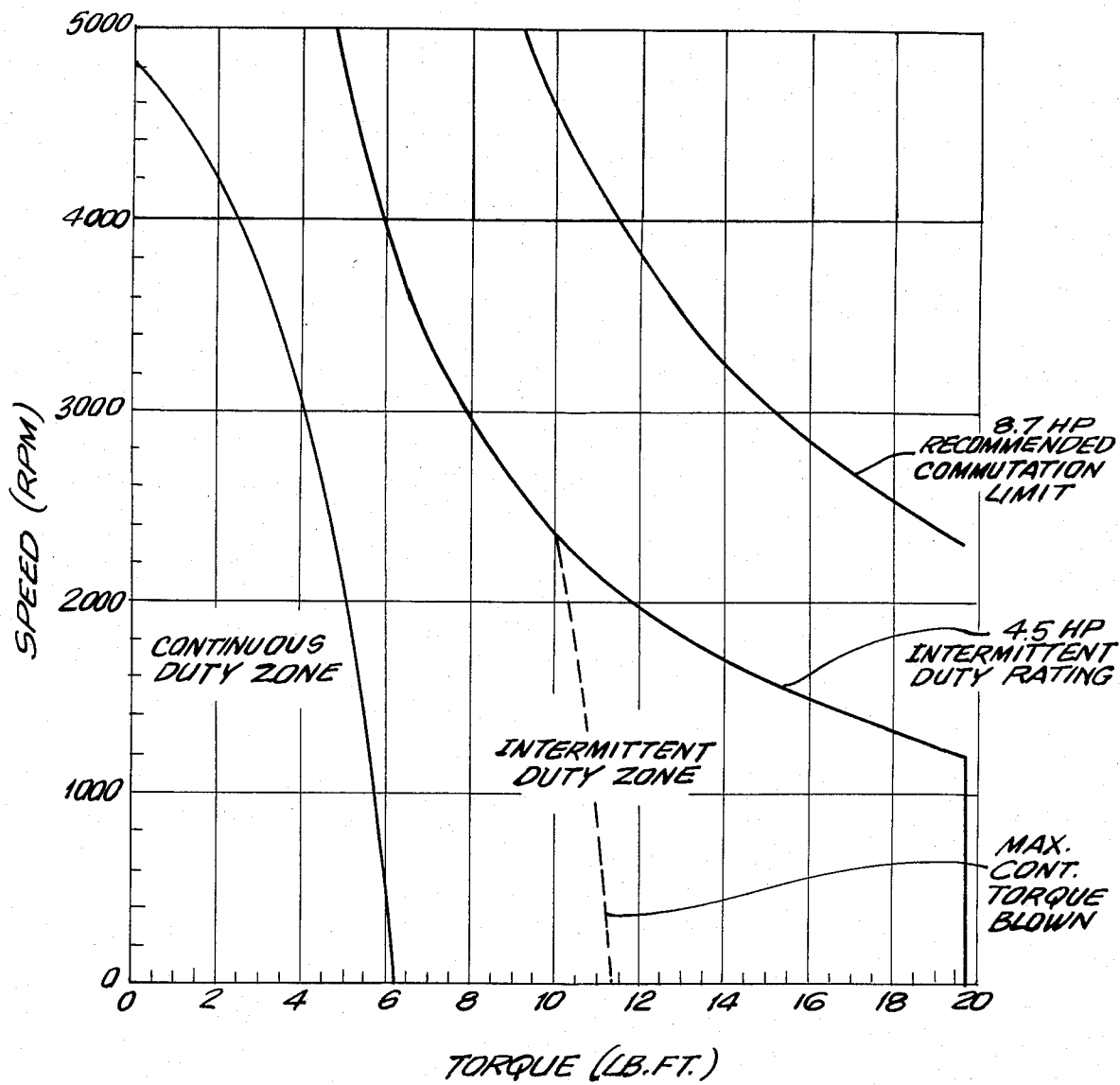
FIG. 8 is a graph of the performances curves for a comparable prior art servomotor.

Referring now to FIGS. 7 and 8, the graphs therein illustrate respectively the performance curves of the servomotor of the present invention and the comparable prior art servomotor of FIGS. 4 and 6. The servomotor of the present invention is able to commutate 11.7 HP during acceleration and deceleration between 5000 rpm and 3000 rpm as opposed to 8.7 HP for the comparable prior art servomotor. Thus, the servomotor of the present is able to commutate 34% more horsepower than the comparable prior art servomotor having a conventional wound iron core armature.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed:

1. In a permanent magnet commutator type D.C. servomotor of the type having a wound iron core armature, wherein the improvement comprises:
    a permanent magnet stator core including an annular yoke having a central axial opening, and
    a plurality of permanent magnet pole pieces within said opening and spaced equally from and about the axis of said yoke, each of said pole pieces including an arcuate permanent magnet and an arcuate member of magnetic material intermediate said permanent magnet and said yoke, the adjoining ends of said arcuate magnets and said arcuate members of magnet material forming a relieved interpole area; wherein the ratio of the combined radial thicknesses of said arcuate permanent magnet and said arcuate member of magnetic material to the combined radial thickness of said arcuate permanent magnet, said arcuate member of magnetic material and said annular yoke is 0.44±20%.

2. A servomotor, as recited in claim 1, in which said magnet stator has two permanent magnet pole pieces.

3. A servomotor, as recited in claim 1, in which said magnet pole pieces and said ratio is $$\left\{ 1 \bigg/ \left( 1 + \frac{2.56}{\text{No. of Poles}} \right) \right\} \pm 20\%.$$

4. A servomotor, as recited in claim 1, in which the ratio of the combined radial thickness of said arcuate permanent magnet, said arcuate member of magnetic material and said annular yoke to the I.D. of said arcuate permanent magnets in said yoke is $0.39 - 5\% + 15\%$.

5. A servomotor, as recited in claim 1, in which said ratio is $$\left\{ \left( 1 + \frac{2.56}{\text{No. of Poles}} \right) \bigg/ 5.83 \right\} + 15\% - 5\%.$$

6. A servomotor, as recited in claim 1, 2, 3, 4 or 5, in which the ratio of the combined radial thickness of said arcuate permanent magnet and said arcuate member of magnet material to the I.D. of said arcuate permanent magnets in said yoke is $0.17 \pm 15\%$.

7. A servomotor, as recited in claim 1, 2, 3, 4, 5 or 6 in which said annular yoke and said arcuate magnetic material members are of one piece.

8. A servomotor, as recited in claim 1, 2, 3, 4, 5, 6 in which said annular yoke is tubular.

9. A servomotor, as recited in claim 1, 2, 3, 4, 5 or 6 in which said tubular annular yoke and said arcuate members are fabricated from a plurality of discs stacked one on the other in a laminated structure.

10. A servomotor recited in claim 1, 2, 3, 4, 5, or 6 in which said arcuate magnetic members are fastened to said annular yoke.

* * * * *